(12) United States Patent
Zelesnik

(10) Patent No.: US 6,711,329 B2
(45) Date of Patent: Mar. 23, 2004

(54) FLAME RETARDANT TUBING BUNDLE

(75) Inventor: Dale J. Zelesnik, Strongsville, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 10/045,828

(22) Filed: Jan. 10, 2002

(65) Prior Publication Data
US 2002/0097966 A1 Jul. 25, 2002

Related U.S. Application Data
(60) Provisional application No. 60/262,170, filed on Jan. 16, 2001.

(51) Int. Cl.[7] .............................................. G02B 6/44
(52) U.S. Cl. ..................................... 385/100; 385/105
(58) Field of Search ............................... 385/100, 101, 385/105, 109

(56) References Cited

U.S. PATENT DOCUMENTS

| | | | | |
|---|---|---|---|---|
| 4,653,851 A | * | 3/1987 | Pedersen et al. | 385/103 |
| 4,818,060 A | * | 4/1989 | Arroyo | 385/103 |
| 5,390,273 A | * | 2/1995 | Rahman et al. | 385/112 |
| 6,028,975 A | * | 2/2000 | Davidson | 385/102 |
| 6,122,424 A | * | 9/2000 | Bringuier | 385/100 |
| 6,167,178 A | * | 12/2000 | Nave | 385/103 |
| 6,173,100 B1 | * | 1/2001 | Newton et al. | 385/102 |
| 6,253,012 B1 | * | 6/2001 | Keller et al. | 385/109 |
| 6,330,385 B1 | * | 12/2001 | Sheu | 385/109 |
| 2002/0136511 A1 | * | 9/2002 | Cecchi et al. | 385/109 |

* cited by examiner

Primary Examiner—Hae Moon Hyeon
(74) Attorney, Agent, or Firm—John A. Molnar, Jr.

(57) ABSTRACT

Flame-retardant flexible tubing bundle construction particularly adapted for use as a conduit for the installation within a plant, building, or other facility of optical fiber cables or other signaling, sensing, or control devices. The tubing bundle construction extends in an axial direction along a central longitudinal axis to an indefinite length, and in a radial direction circumferentially about the longitudinal axis. The construction includes, typically, a plurality of plastic tube members each extending axially along the longitudinal axis and being arranged with the other tube members radially about the longitudinal axis to form a bundle. At least one thermal transfer layer may be provided to surround the tube member bundle. The thermal transfer layer, in turn, is surrounded by at least one fire-resistant layer which is formed of a fibrous material such as an aramid fiber tape.

17 Claims, 1 Drawing Sheet

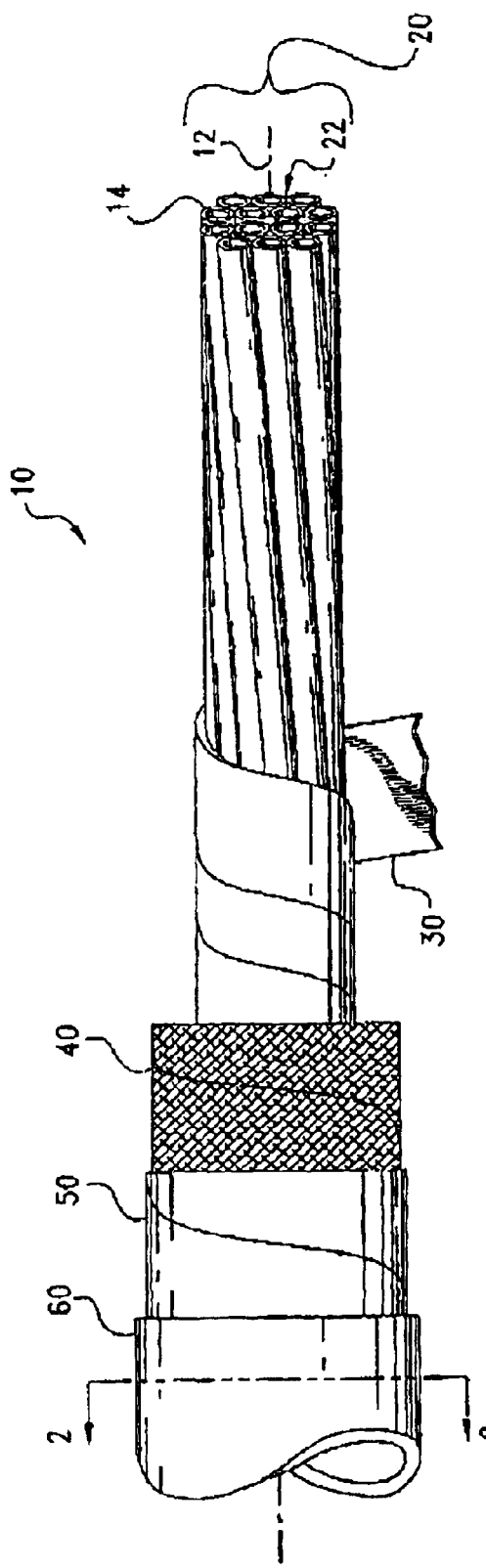
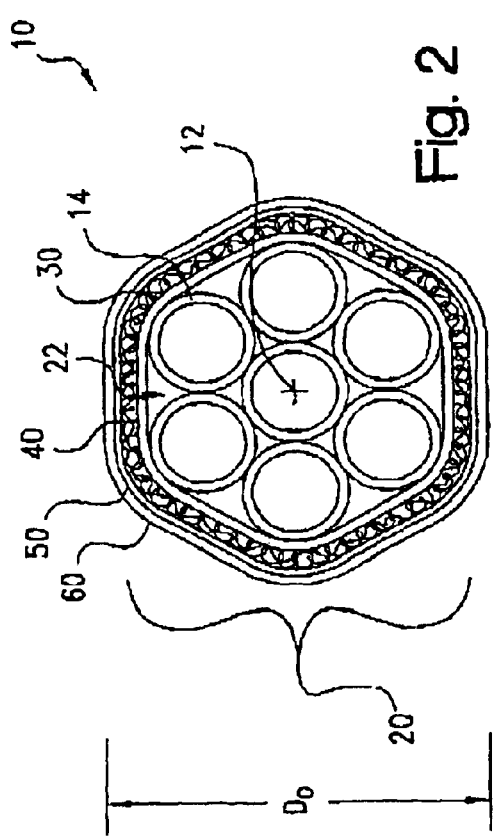

FLAME RETARDANT TUBING BUNDLE

CROSS-REFERENCE TO RELATED CASES

The present application claims the benefit of the filing date of U.S. Provisional Application Ser. No. 60/262,170; filed Jan. 16, 2001 now abandoned.

BACKGROUND OF THE INVENTION

The present invention relates broadly to plastic, i.e., polymeric, flexible tubing bundle constructions, and more particularly to flame retardant multi-tube bundle constructions principally for optical fiber cable installation applications.

Flexible tubing bundles of the type herein involved are used in a variety of instrumentation, control, sensing, and fluid transfer applications as shown, for example, in U.S. Pat. Nos. 5,563,975; 5,392,374; 4,653,541; and 2,578,280, and in the publications "Parflex Multitube® Instrumentation and Heat Trace Tubing Products," Catalog 4200-M-1/USA, May 2000, Parker Hannifin Corporation, and "FutureFlex® Systems Innovative Cable Product Catalog," Sumitomo Electric Lightwave Corp. In basic construction, such bundles involve an inner bundle of high density polyethylene, nylon, or other plastic tubing, and an outer cover or jacket which surrounds the bundle. Electrical wires, optical fiber cables, and other signaly devices typically are received through the each of the tubes in the bundle which thereby provide a means both for the routing of the devices through an installation and for segregating different groupings of those devices. Depending upon the requirements of the particular application or installation, one or more intermediate layers of fiber, tape, foil, or plastic may be extruded, wrapped, knitted, woven, or otherwise provided between the jacket and the tubing bundles as a physical reinforcement and/or for thermal or electrical insulation or flame resistance.

Indeed, flame retardancy is of particular importance in the case of tubing bundles for optical fiber cables or other signaling devices intended for vertical installation within a plant, building, or other facility. In this regard, without some degree of flame retardancy, there can exist in a fire situation the potential for flame to propagate vertically along the tubes in the bundle to adjacent floors in the structure. Accordingly, tubing bundles intended for vertical installations generally must comply, in the U.S. and elsewhere, with certain codes, standards, or other regulations, most commonly Underwriter's Laboratories (UL) Standard No. 1666, "Test for Flame Propagation Height of Electrical and Optical-Fiber Cables Installed Vertically in Shafts." As a result, it is believed that tubing bundles constructions meeting, particularly, UL 1666 would be well-received by, among others, the optical fiber cable market.

BROAD STATEMENT OF THE INVENTION

The present invention is directed to flexible plastic, i.e., thermoplastic, tubing bundle constructions, and particularly to a flame retardant multi-tube construction which is particularly adapted for installations of optical cables or other signaling devices. In one arrangement, the construction includes an innermost thermal transfer layer which surrounds the tubing bundle and thereby provides for the conduction of heat way from the tubes to thereby minimize the ignition thereof and the resultant potential, particularly in a vertical installation, to propagate the fire in a flame environment. A fire-resistant layer is provided to surround the thermal transfer layer to further insulate the tubes to maintain the temperature thereof below their ignition or combustion temperature. The fire-resistant layer also functions to maintain the mechanical integrity of the construction in a fire situation and otherwise to retard flame penetration into the tubing bundle. Advantageously, the tubing bundle construction of the present invention is believed would meet UL 1666 requirements without the necessity to provide an innermost thermoplastic layer which is intended to intumescence or liquefy and then to char as a means of providing a fire stop barrier.

In an illustrative embodiment, the tubing bundle construction includes at least one and, typically, a plurality of high density or molecular weight polyethylene, nylon, or other plastic tubes arranged in a bundle. An innermost layer of an aluminum or other metal foil tape, or other thermally-conductive material, is spiral or otherwise wrapped over the tube bundle, preferably in an overlapping, spiral fashion, with a fire-resistant layer of an aramid fiber or other fire-resistant tape being spiral wrapped over the metal foil layer. Optionally, a polyester or other film tape may be spiral or otherwise wrapped over the fire-resistant tape as a moisture and vapor barrier layer, with a jacket formed of a flame-retardant polyvinyl chloride or other thermoplastic or plastic being extruded or wrapped over the vapor barrier layer.

The present invention, accordingly, comprises the construction, combination of elements, and arrangement of components which are exemplified in the detailed disclosure to follow. Advantages of the present invention include a flexible tubing bundle tubing construction which is particularly adapted for vertical optical fiber cable installations, and which is believed would comply with UL 1666 requirements. Additional advantages include a tubing bundle construction which is economical to manufacture. These and other advantages will be readily apparent to those skilled in the art based upon the disclosure contained herein.

BRIEF DESCRIPTION OF THE DRAWING

For a fuller understanding of the nature and objects of the invention, reference should be had to the following detailed description taken in connection with the accompanying drawing wherein:

FIG. 1 is a side elevational, cut-away view of a representative embodiment of a tubing bundle construction in accordance with the present invention; and FIG. 2 is a radial cross-sectional view of the tubing bundle construction of FIG. 1 taken through line 2—2 of FIG. 1.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" and "axial" referring, respectively, to directions perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the purposes of the discourse to follow, the precepts of the tubing bundle construction of the invention herein involved are described in connection with a representative embodiment which is adapted particularly for use as a conduit for the installation within a plant, building, or other facility of optical fiber cables or other signaling, sensing, or control devices. It will be appreciated, however, that aspects of the present invention may find use in other tubing bundle constructions for a variety of instrumentation, control, sensing, and fluid transfer. Use within those such other applications therefore should be considered to be expressly within the scope of the present invention.

Referring then to the figures wherein corresponding reference numbers are used to designate corresponding elements throughout the several views, a representative flame-retardant flexible tubing bundle construction according to the present invention is shown generally at 10 in the cut-away view of FIG. 1 and in the radial cross-sectional view of FIG. 2. In basic dimensions, tubing bundle construction 10 extends axially to an indefinite length along a central longitudinal axis, 12, and in a radial direction circumferentially about axis 12 in defining an outer diametric extent, referenced generally at "$D_o$" in the radial cross-sectional view of FIG. 2. Such extent will vary depending upon, for example, the number of tubes in the bundle, but generally will be between about 0.25–2.00 inch (0.65–5.0 cm).

As may be seen in the different views of FIGS. 1 and 2, tubing bundle construction 10 includes at least one and, typically, 2, 3, 7, 19, or even 50 or more tube members, one of which is referenced at 14. As with the overall dimensions of tubing bundle construction 10, the dimensions of tube members 14 may vary with the particular application envisioned. Typically, however, each of the tubes 14, which may be of the same or different size, will have an inner diameter of between about 0.062–2.00 inch (0.158–5.08 cm), and an outer diameter of between about 0.100–2.50 inch (0.254–5.45 cm) to define a wall thickness therebetween of between about 0.019–0.250 inch (0.5–6 mm).

Conventionally, each of the tube members 14 may be provided as extruded, molded, or otherwise formed of a plastic, i.e., thermoplastic, material, which material may be the same as, or different from, the plastic material forming the other tube members 14. Suitable materials, along with copolymers and blends thereof, include polyesters, fluoropolymers, polyvinyl chlorides, polyimides, polyurethanes, poly(ether ether ketone), polyetherimides, polybutylene and polyethylene terephthalates, polysulfones, polyacrylics, polymethylacrylates, polymethylmethacrylates, polycarbonates, poly(ester and ether urethanes), liquid crystal polymers (LCP), acetal homo and copolymers, and, preferably, polyolefins such as high density or molecular weight polyethylene and polyamides such as Nylon 12, but as may be specifically selected for high or low temperature resistance, surface characteristics such as coefficient of friction, physical or mechanical properties such as flexural modulus, or, in the case of fluid transfer, chemical compatibility with the fluid being handled. Alternatively, tube such members 14 may be formed of a thermoplastic, i.e., melt processible, synthetic rubber such as a chlorosulfonate, polybutadiene, butyl, neoprene, nitrile, polyisoprene, or buna-N, a copolymer rubber such as ethylene-propylene (EPR), ethylene-propylene-diene monomer (EPDM), nitrile-butadiene (NBR) or styrene-butadiene (SBR), or a blend such as ethylene or propylene-EPDM, EPR, or NBR, or a copolymer or blend of any of the foregoing. The term "synthetic rubbers" also should be understood to encompass materials which alternatively may be classified broadly as thermoplastic elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides.

The materials forming tube members 14 may include fillers and additives, which may be in liquid, powder, particulate, flake, fiber, or other form, and which may include electrically-conductive fillers, pigments, microwave-attenuating fillers, thermally-conductive fillers, lubricants, wetting agents, stabilizers, antioxidants, pigments, coloring or opacifying agents, luminescents, light reflectants, chain extending oils, tackifiers, blowing agents, foaming or anti-foaming agents, reinforcements such as glass, carbon, or textile fibers, and particularly fire retardants such as halogenated compounds, metal oxides and salts, intercalated graphite particles, borates, siloxanes, phosphates, glass, hollow or solid glass or elastomeric microspheres, silica, silicates, mica, and the like. Typically, the fillers and additives are blended or otherwise admixed with the base polymer, and may comprise between about 0.3–80% or more by total volume of the formulation.

Each of the tube members 14 extends longitudinally along axis 12 generally parallel to each of the other tube members 14, and are packed or otherwise abuttingly arranged with each of the other tube members 14 radially about axis 12 to define the compact array or bundle referenced generally at 20. As may be seen in the cut-away view of FIG. 1, the bundle 20 optionally may be formed so as to exhibit a slight, i.e., 0.15–2.4 turns per foot (0.5–7.9 turns per meter), helical twist or spiral relative to axis 12 to resist the sagging of any one of the constituent tube members 14 below any of the other members. One or more insulated or other electrical or optical communication wires (not shown) may be bundled with the tube members 14 such as by being run through one or more of the interstices, one of which is referenced at 22, between the tube members.

Optionally, at least one thermal transfer layer, 30, may be provided as an innermost layer to surround bundle 20 for conducting or otherwise dissipating heat away from the tube members 14 in the event of a fire situation and thereby assisting in maintaining the tube members 14 at temperature below the combustion temperature thereof. Thermal transfer layer 30 may be formed from a copper, aluminum, or other metal foil tape, or other thermally-conductive or dissipative material, which may be spiral, i.e., helically, wrapped in an overlapping manner along axis 12 over the surfaces of the outer tube members 14 forming the bundle 20. Depending again upon the number of tube members 14 in the bundle 20, such tape may be between about 0.5–2.0 inch (1.3–5.0 cm) wide, and have a thickness of between about 1–2.5 mils (0.025–0.06 mm). It will be appreciated that, so formed, thermal transfer layer 30 exhibits a relatively high, as compared to the tube members 14, thermal conductivity of, for example, at least about 0.14 W/m-°K which is effective to dissipate heat by conduction or other thermal transport mechanism away from the interior of the tube bundle 20. In service, thermal transfer layer 30, if formed of an electrically-conductive material, may be grounded depending upon the requirements of the particular application.

In further accordance with the precepts of the present invention, at least one fire-resistant layer, 40, is provided to surround the thermal transfer layer 30 or, if no layer 30 is employed, to surround the tube bundle 20 and any intermediate layers therebetween. Fire-resistant layer 40 functions to insulate the tubes to assist in maintaining the temperature thereof below their ignition or combustion temperature. Accordingly, within a fire situation, the tubes 14 in bundle 20 are allowed time to melt and drip away from the construction 10, thereby making it at least somewhat self-extinguishing when the flame source is removed, rather than remaining with the construction and offering the potential to burn and propagate the flame along the bundle 20. The fire-resistant layer 40 also functions to maintain the mechanical integrity of the construction 10 in a fire situation and otherwise to retard flame penetration into the tubing bundle 20.

Fire-resistant layer 40 may be formed of a fibrous, flame-resistant material which is knitted, braided, woven, wound, or, preferably, formed as a tape which is spiral wrapped in an overlapping manner along axis 12 as an outer layer over the thermal transfer layer 30. Depending again upon the number of tube members 14 in the bundle 20, such tape may be between about 1–4 inch (2.5–10 cm) wide, and have a thickness of between about 100–200 mils (2.5–5 mm). Preferably, the fire-resistant layer is formed as a web, felt, or other non-woven fabric which is needled or otherwise formed of filaments or strands, which may be in the form of a monofilament, yarn, thread, or ply, or staples, of an aramid or azole fiber, a blend of aramide or azole fibers, or a blend of one or more aramid fibers and one or more azole fibers. Preferred azole fibers include polyphenylene bezobisoxazole (PBO) and polybenzimidazole (PBI) fibers, with preferred aramid fibers including poly-paraphenylene terephthalamide fibers, such as those sold under the tradenames Kevlar® (E. I. DuPont de Nemours and Co., Wilmington, Del., USA), Technora® (Teijin Ltd., Tokyo, Japan), and Twaron® (Akzo Nobel, Arnhem, The Netherlands), and poly(m-phenyleneisophthalamide) fibers, such as those sold under the tradename Nomex® (DuPont). By fire-resistant, it is meant, for example, that the material should exhibit a Limiting Oxygen Index (LOI) value, according to ASTM D-2863-77, of at least about 0.30. A particularly preferred fire-resistant material is a low density, i.e., between about 5–10 oz/yd$^2$, 0.1–0.2 inch (2.5–5 mm) thick, needled felt formed of about 3-inch m-(7.6 cm) long, about 2 denier poly(phenyleneisophthalamide) staple fibers.

To limit the penetration of liquid or vapor into the tube bundle 20, at least one moisture barrier layer, 50, optionally may be provided to surround fire-resistant layer 40. Moisture barrier layer 50 may be formed as a polymeric film which is extruded or, preferably, spiral wrapped as a tape in an overlapping manner along axis 12 over the outer surface of the fire-resistant layer 40. Depending once again upon the number of tube members 14 in the bundle 20, such tape may be between about 0.5–2.0 inch (0.65–5.0 cm) wide, and have a thickness of between about 1–5 mils (0.025–0.13 mm). A preferred material for moisture barrier layer 50 is a polyester film which is marketed under the name Mylar® (DuPont).

The moisture barrier layer 50, or other outermost layer, in turn, may sheathed within one or more layers of a coaxially-surrounding protective cover or jacket, referenced at 60. Depending upon its construction, jacket 60 may be spiral or longitudinally, i.e., "cigarette," wrapped, braided, or, preferably, cross-head, co-extruded, or otherwise conventionally extruded over the barrier layer 50 as, for example, a 0.02–0.15 inch (0.5–3.8 mm) thick layer of an abrasion-resistant, thermoplastic material, copolymer, or blend of a fiber, glass, ceramic, or metal-filled or unfilled polyamide, polyolefin, polyester, polyurethane or other thermoplastic elastomer, or, most preferably, flame-retardant polyvinyl chloride. By "abrasion-resistant," it is meant that such thermoplastic material for forming jacket 60 may have a hardness of between about 60–95 Shore A durometer. As may be seen best in the cross-sectional view of FIG. 2, jacket 60 substantially conforms to the shape of the tube bundle 20, and imparts a radially compressive force thereon to maintain the tube members 14 in the bundle in abuttingly adjacent contact.

Although the illustrative flame-retardant tubing bundle construction 10 of FIGS. 1 and 2 has been described wherein a thermal transfer layer 20 is employed as an innermost layer surround tube bundle 30, and as including moisture barrier layer 50 as an outermost layer with jacket 60, other constructions may be envisioned in view of the disclosure contained herein, and as dictated by the requirements of the particular application involved. For example, multiple layers 30, 40, and 50 may be employed within the construction 10.

Thus, an illustrative flame-retardant flexible tubing bundle construction is described which is particularly adapted for vertical optical fiber cable installations as it is believed such construction would be in general conformity with the requirements of UL 1666. Such construction, which may be entirely thermoplastic, moreover, is economical to manufacture and may be adapted to a variety of instrumentation, control, sensing, and fluid transfer applications.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. A flame-retardant flexible tubing bundle construction, said tubing bundle extending in an axial direction along a central longitudinal axis to an indefinite length, and in a radial direction circumferentially about said longitudinal axis, said tubing bundle construction comprising:

one or more plastic tube members each extending axially along said longitudinal axis and being arranged with the other maid tube members radially about said longitudinal axis to form a bundle;

at least one thermal transfer layer formed of a metal foil material surrounding said bundle of said tube members; and at least one fire-resistant layer surrounding said thermal transfer layer, fire-resistant layer being formed of a fibrous material.

2. The flame-retardant flexible tubing bundle construction of claim 1 wherein said tube members each is formed, independently, of a thermoplastic material selected from the group consisting of polyamides, polyolefins, silicones, fluoropolymers, polyvinyl chloride, polyurethanes, and copolymers and blends thereof.

3. The flame-retardant flexible tubing bundle construction of claim 1 wherein said metal foil material is formed of a metal selected from the group consisting of aluminum, copper, brass, and alloys thereof.

4. The flame-retardant flexible tubing bundle construction of claim 1 wherein said metal foil material has a thickness of between about 1–2.5 mils (0.025–0.06 mm).

5. The flame-retardant flexible tubing bundle construction of claim 1 wherein said metal foil material is formed as a tape wrapped spirally about said bundle.

6. The flame-retardant flexible tubing bundle construction of claim 1 wherein said fibrous material is formed of fibers selected from the group consisting of aramid fibers, azole fibers, and blends thereof.

7. The flame-retardant flexible tubing bundle construction of claim 6 wherein said aramid fibers are selected from the group consisting of poly-paraphenylene terephthalamide fibers, poly(m-phenyleneisophthalamide) fibers, and blends thereof, and wherein said aramid fibers are selected from the group consisting of polyphenylene bezobisoxazole fibers, polybenzimidazole fibers, and blends thereof.

8. The flame-retardant flexible tubing bundle construction of claim 6 wherein said fibrous material is formed as a non-woven fabric.

9. The flame-retardant flexible tubing bundle construction of claim 8 wherein said non-woven fabric is formed as a tape wrapped spirally about said thermal transfer layer.

10. The flame-retardant flexible tubing bundle construction of claim 1 wherein said fibrous material has a Limiting Oxygen Index (LOI) of at least about 0.30.

11. The flame-retardant flexible tubing bundle construction of claim 1 further comprising a moisture barrier layer surrounding said fire-resistant layer.

12. The flame-retardant flexible tubing bundle of claim 11 wherein said moisture barrier layer is formed of a polymeric film.

13. The flame-retardant flexible tubing bundle construction of claim 12 wherein said polymeric film is formed of a polymeric material selected from the group consisting of polyesters, polyimides, polyamides, polyolefins, silicones, fluoropolymers, polyvinyl chloride, polyurethanes, natural and synthetic rubbers, and copolymers and blends thereof.

14. The flame-retardant flexible tubing bundle construction of claim 13 wherein said polymeric film is formed as a tape wrapped spirally about said fire retardant layer.

15. The flame-retardant flexible tubing bundle construction of claim 1 further comprising a jacket surrounding said fire-resistant layer.

16. The flame-retardant flexible tubing bundle construction of claim 15 wherein said jacket is formed of one or more layers of a polymeric material selected, independently, from the group consisting of polyurethaues, polyamides, polyolefins, silicones, polyvinyl chlorides, polyurethanes, and copolymers and blends thereof.

17. The flame-retardant flexible tubing bundle construction of claim 1 wherein said thermal transfer layer has a thermal conductivity of at least about 0.14 W/m-°K.

* * * * *